W. M. MARSHALL.
Flooring-Mats.

No. 156,030.  Patented Oct. 20, 1874.

Witnesses:
A. P. Grant.
John A. Wiedersheim

Inventor:
William Marot Marshall

THE GRAPHIC CO. PHOTO-LITH. 39 & 41 PARK PLACE, N.Y.

UNITED STATES PATENT OFFICE.

WILLIAM M. MARSHALL, OF PHILADELPHIA, PENNSYLVANIA.

IMPROVEMENT IN FLOORING-MATS.

Specification forming part of Letters Patent No. 156,030, dated October 20, 1874; application filed February 13, 1874.

*To all whom it may concern:*

Be it known that I, WILLIAM M. MARSHALL, of the city and county of Philadelphia, and the State of Pennsylvania, have invented a new and useful Improvement in Flooring, &c.; and I do hereby declare the following to be a clear and exact description of the nature thereof, sufficient to enable others skilled in the art to which my invention appertains to fully understand, make, and use the same, reference being had to the accompanying drawings making part of this specification, in which—

Figure 1:
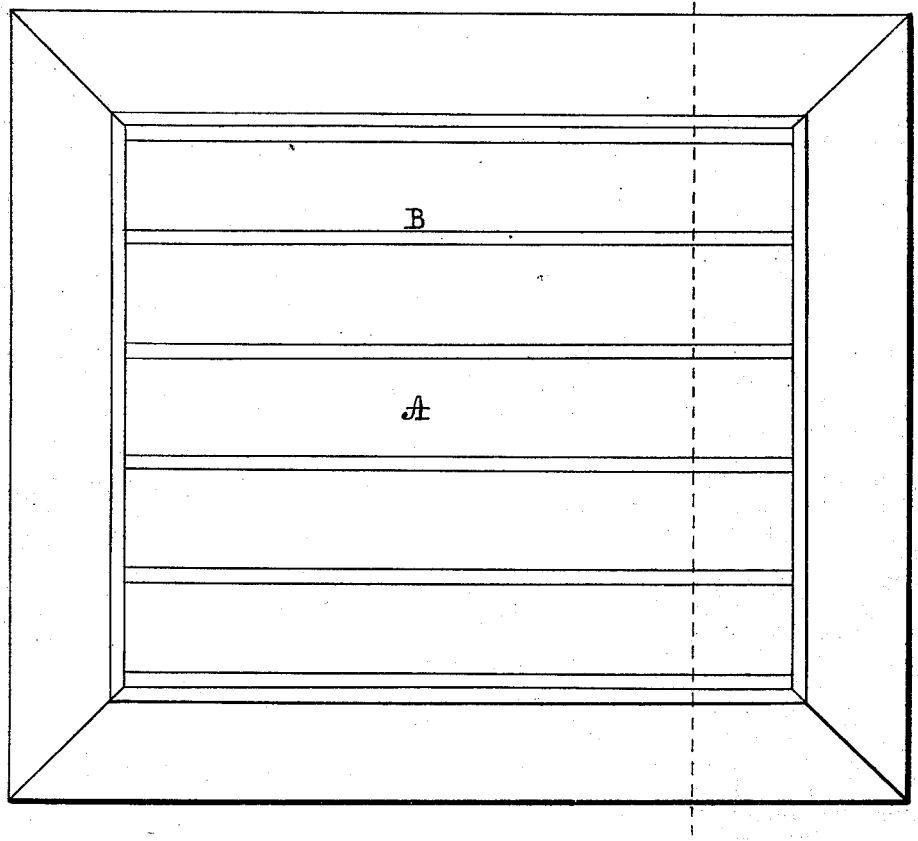
Figure 2:
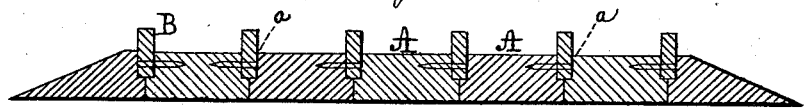
Figure 3:
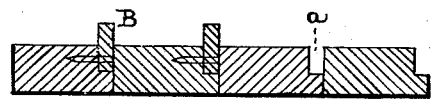

Figure 1 is a top or plan view of the device embodying my invention. Fig. 2 is a longitudinal vertical section thereof. Fig. 3 is a similar view of a slight modification.

Similar letters of reference indicate corresponding parts in the several figures.

This invention consists in constructing a flooring, mat, &c., of a series of pieces having the side edges of the upper faces thereof grooved longitudinally, and a series of rubber strips laid in the grooves and nailed to the pieces, so that each rubber strip will be supported by two adjacent pieces and secured in place without danger of displacement.

Referring to the drawings, A represents a series of pieces having the edges of the upper faces formed with longitudinally-extending grooves *a a*, and the bottom of the pieces rests on the floor or the pieces constitute the floor. B represents strips of rubber which are fitted in the grooves *a a*, and extend above the upper faces of the pieces A, so as to form a rubber thread. In forming the flooring or mat, I take a piece, A, apply a strip, B, to the groove thereof, and nail or screw said strip to the piece A, the nails or screws being applied laterally or horizontally. Another piece, A, is now brought up against the first piece A, and also the rubber B, so that the latter will rest between the two pieces A and supported laterally thereby. A strip of rubber is now laid in the groove of the second piece and nailed or screwed, as in the first case, and thus I continue building up the flooring or mat.

It will be seen that the size of the structure may be increased to the utmost capacity of the room or place where it is to be used.

The horizontal nailing or screwing of the rubber strips B to the pieces A forms reliable means of securing the strips in position, and as the heads of the nails or screws will be sustained by the contact and pressure of the adjacent pieces A the security of the strips is increased. The structure will be found to be firm and durable, and have an elastic tread. Washing and cleansing thereof is readily accomplished, since a broom or other suitable means may be operated in the channels formed between the upwardly-projecting rubber strips and extending continuously the longitudinal direction of the same.

Should the water penetrate the points between the joints between the pieces and strips it cannot injure the fastenings of the strips, since the nails or screws are reliable fastenings, as they are well imbeded in the rubber and held between the pieces A. It will also be noticed that by building up the structure the rubber strip can be firmly nailed or screwed, since one side of each strip is accessible for such purpose, this being an important feature of the invention.

I am aware that an elastic-faced stair-plate has been constructed of rubber studs fitted in openings in a face-plate, but there is no provision for increasing by building, as in mine, and great difficulty exists in fitting and securing the studs, whereby my device shows decided advantages. I therefore disclaim such features; but What I do claim as new, and desire to secure by Letters Patent, is—

The series of pieces A, with grooved side edges *a a*, in combination with the series of rubber strips B fitted in the grooves between adjacent pieces A, and nailed or screwed to the pieces at the sides thereof, when the parts are constructed, arranged, and operate substantially as and for the purpose herein set forth.

Philadelphia, February 6, 1874.

WILLIAM MAROT MARSHALL.

Witnesses:
JOHN M. GAUGHER,
W. L. RUSHTON.